United States Patent [19]

Boston

[11] Patent Number: 4,695,468
[45] Date of Patent: Sep. 22, 1987

[54] PROCESS FOR PRODUCING CARBONATED BEVERAGES

[75] Inventor: Ronald P. Boston, Middle Le Havre, Lunenburg County, Canada

[73] Assignee: Fronda Limited, Bridgewater, Canada

[21] Appl. No.: 782,577

[22] Filed: Oct. 1, 1985

[30] Foreign Application Priority Data

Oct. 5, 1984 [CA] Canada .................................. 464891

[51] Int. Cl.$^4$ .............................................. A23L 2/26
[52] U.S. Cl. ...................................... 426/8; 426/397; 426/477; 426/11
[58] Field of Search ....................... 426/8, 13, 51, 477, 426/591, 590, 120, 86, 397, 11

[56] References Cited

U.S. PATENT DOCUMENTS

| | | |
|---|---|---|
| 6,333 | 4/1849 | Andrews et al. .................... 426/477 |
| 112,610 | 3/1871 | Maloney .............................. 426/477 |
| 2,073,273 | 3/1937 | Wetstein . |
| 2,548,701 | 4/1951 | Carveth ................................... 426/8 |
| 2,603,569 | 7/1952 | Altner et al. . |
| 2,631,521 | 3/1953 | Atkins . |
| 2,694,641 | 11/1954 | Atwood et al. . |
| 2,712,998 | 7/1955 | Vosseler ................................... 426/8 |
| 2,742,363 | 4/1956 | Hughes . |
| 2,851,359 | 9/1958 | Diller . |
| 2,851,360 | 9/1958 | Diller ............................... 426/590 |
| 2,953,459 | 9/1960 | Diller . |
| 3,112,201 | 11/1963 | Saez ....................................... 426/8 |
| 3,120,441 | 2/1964 | Asturias ............................... 426/51 |
| 3,241,977 | 3/1966 | Mitchell . |
| 3,441,417 | 4/1969 | Feldman . |
| 3,467,526 | 9/1969 | Mitchell et al. ..................... 426/477 |
| 3,476,520 | 11/1969 | Hovey ................................. 426/477 |
| 3,598,609 | 8/1971 | Hoynak ............................... 426/590 |
| 3,667,962 | 6/1972 | Fritzberg et al. . |
| 3,729,553 | 4/1973 | Gold et al. .......................... 426/590 |
| 4,009,285 | 2/1977 | Spooner . |
| 4,186,215 | 1/1980 | Buchel ................................ 426/477 |
| 4,423,670 | 1/1984 | Tenison . |

FOREIGN PATENT DOCUMENTS

| | | |
|---|---|---|
| 723604 | 12/1965 | Canada . |
| 1052618 | 4/1979 | Canada . |
| 1103982 | 6/1981 | Canada . |
| 1124569 | 6/1982 | Canada . |
| 1173289 | 8/1984 | Canada . |
| 27358 | 4/1981 | European Pat. Off. ............ 426/477 |
| 3043282 | 10/1982 | Fed. Rep. of Germany .......... 426/8 |
| 2526039 | 11/1983 | France ................................... 426/8 |
| 2537600 | 6/1984 | France ................................. 426/13 |
| 5700 | 10/1891 | United Kingdom ................. 426/13 |
| 2076628 | 12/1981 | United Kingdom ................. 426/86 |
| 2087426 | 5/1982 | United Kingdom ................. 426/51 |

OTHER PUBLICATIONS

Developments in Soft Drinks Technology-1, Green, Applied Science Publ., 1978.
Elements of Food Technology, Desrosier, Avi Publ., 1977.
Food Industries, 3/49, p. 134.

*Primary Examiner*—Steven Weinstein
*Attorney, Agent, or Firm*—Dennison, Meserole, Pollack & Scheiner

[57] ABSTRACT

A method is disclosed of producing a carbonated beverage for example a soft drink, which method comprises dispensing into a sealable receptacle a predetermined amount of a liquid flavor extract, adding to said receptacle an appropriate portion of yeast; fermentable sugar and an amount of water to provide suitable dilution of said flavor extract, and permitting the receptacle to stand so as to effect fermentation by the yeast and consequently production of a carbonated soft drink. Control reagents are incorporated in the liquid flavor extract to provide a suitable "bite" in the eventual beverage and to cause termination of fermentation when the pH drops to a certain level. The method affords a simple means of producing soft drink beverages in small or large quantities in the home. Also disclosed is a unitary package comprising the liquid flavor extract, individual portions of the yeast and dispensing means for releasing a predetermined portion of the extract into a sealable receptacle for commencing the fermentation procedure.

13 Claims, No Drawings

4,695,468

PROCESS FOR PRODUCING CARBONATED BEVERAGES

BACKGROUND OF THE INVENTION (1) Field of the Invention

This invention relates to a method of producing a carbonated beverage and a unitary carbonated beverage package suitable for performing the method of the invention.

Carbonated non-alcoholic beverages are generally packaged and distributed in glass bottles or metal cans. About 85 to 90% of the contents thereof constitutes water. Thus, a large percentage of the cost of handling and distribution of such beverages is essentially expended on handling and distributing water. The use of glass bottles as the packaging medium has the additional disadvantage that, for economic use, the bottles should be returnable. Naturally, the cost of transporting empty bottles and sterilizing them prior to refilling adds to the final cost of the beverage.

An attempt to lower the cost to the consumer of fruit flavoured non-alcoholic beverages has been made by the marketing of fruit syrups which are diluted with water by the consumer prior to consumption. The resulting beverage is not, of course, carbonated and does not have the characteristic pungent taste or "bite" and sparkle of a carbonated beverage. Similarly, dry fruit flavoured powders are widely available, which when dissolved in water in the proper ratio yield a fruit flavoured beverage. Naturally, such beverages also do not have the characteristic bite and sparkle of carbonated beverages and, furthermore, many popular flavours such as the ginger and cola flavours can not conveniently be transformed into dry powder form.

(2) Discussion of the Prior Art

In an attempt to advance the non-alcoholic beverage industry, Canadian Pat. No. 723,604 (Larsen, et al) discloses a method for packaging and distributing carbonated non-alcoholic beverages which avoids the need for handling large amounts of water and also obviates the need for returnable glass bottles. Larsen et al packaged a fruit syrup of suitable concentration in a valved pressure container (aerosol container), together with a non-toxic pressure-generating propellant such as carbon dioxide or a mixture of carbon dioxide and another non-toxic propellant. A carbonated beverage may then be produced by a consumer by dispensing a suitable amount of the carbonated syrup into a glass of water. However, this method suffers from various disadvantages, including the need for a given consumer to purchase an expensive valved pressure container and the possible need to use various propellants other than carbon dioxide such as, nitrous oxide, nitrogen or fluorinated hydrocarbon. Furthermore, release of the carbonated syrup into a glass of water results in a major discharge of carbonation, which effect is enhanced if, as often will be the case, the glass of water contains ice cubes. In consequence, the method outlined in Canadian Pat. No. 723,604 is inadequate to consistently produce in the home carbonated beverages possessing an adequate degree of carbonation, along with the characteristic desired pungent taste or bite and sparkle.

A further attempt to solve the problem of affording home production of carbonated beverages of good quality in small or large quantities is described in Canadian Pat. No. 1,052,618 (Kennedy). In this prior disclosure, a dry beverage mix contains phosphoric acid in a dry, stable form. The beverage mixes described rapidly dissolve in water, which may be carbonated. The particular compositions disclosed seek to duplicate the unique cola or other soft drink flavour of commercial offerings, which is partly due to interaction between the phosphoric acid and other flavour components during an aging period of the liquid flavour base. The prior patent seeks to achieve this object by including in the flavour base an amount of mono alkali ortho phosphate at least equimolar to the phosphoric acid content of the flavour base. A variety of carbonation systems is disclosed for providing suitably carbonated, flavourful beverages. Included among these are addition of the dry beverage particles to pre-carbonated water or combination of the dry beverage particles with a carbonation system which is then added to tap water. Examples of suitable sources of pre-carbonated water are the use of bottled pre-carbonated water, commonly known as "club soda" or the use of pressure carbonators which utilize carbon-dioxide charged cylinders to carbonate water as it is dispensed. A further possibility is the use of carbon-dioxide-loaded zeolite molecular sieves. This prior process tends to suffer from disadvantages of insufficient carbonation and difficulty in dissolving the crystals or the expense and inconvenience of providing a point-of-consumption carbonation system or the use of molecular sieves, which when spent remain as residues in the bottom of the glass or receptacle being employed.

Canadian Pat. No. 1,103,982 (McCarty et al) discloses a carbonated beverage mix comprising a fructose sweetener, a flavourant, an acidulant and an instant carbonation device effective to carbonate the beverage when the mix is brought into contact with a beverage-making liquid, for example water. The preferred instant carbonation device is a carbon dioxide-loaded molecular sieve device and the method disclosed for making such beverages suffers from similar disadvantages to those discussed above with respect to the Kennedy Canadian Pat. No. 1,052,618.

Also of interest is Canadian Pat. No. 1,173,289 (Coeffier) which relates to a process for the manufacture of a carbonated beverage comprising preparing a solution of sugar and water and adding thereto a second solution containing fermentation agents to promote the formation of carbon dioxide by fermentation so as to effect carbonization of the beverage. The fermentation is terminated before the occurrence of significant alcohol formation and such termination is taught as being achieved by abrupt cooling. Treatment is then carried out to avoid further fermentation when the beverage returns to ambient temperature, for example pasteurization. Thus, Coeffier describes an industrial process similar to beer production employing pasteurization and also filtration techniques requiring expensive equipment not available to the domestic consumer.

Finally, Canadian Pat. No. 1,124,569 (Saleeb et al) relates to a process for preparing carbonated liquids with coated crystalline zeolites or coated charcoal. Thus, a process of carbonating an aqueous liquid is disclosed which comprises contacting an aqueous liquid under atmospheric or super atmospheric pressure with an effective amount of an adsorbent coated with a layer of a monomeric organic compound with a molecular weight below 500 and having adsorbed therein at least 20 cubic centimeters of carbon dioxide per gram of adsorbents, said adsorbent being a crystalline zeolite or an activated charcoal. This prior proposal also suffers from similar disadvantages to those discussed above, in that it fails fully to address the problem of achieving desirable bite in the eventual beverage and the fact of needing to employ expensive adjuncts as a source of carbon dioxide, namely the crystalline zeolite or activated charcoal. The problem also remains of the disposal of the spent zeolite or charcoal.

Attempts to commercialize home preparation of carbonated beverages have not achieved lasting success over the years. The principal shortcoming of the several techniques available has been that the consumer-prepared carbonated beverage has been significantly inferior in one or more aspects to the commercially available bottled or canned carbonated beverages. Generally speaking, quantity and quality of carbonation in home-produced beverages has been inadequate and bubble size and duration of effervescence compare unfavourably with commercially-available beverages.

On the other hand, significant advantages obtain with respect to home preparation of carbonated beverages. Thus, the use of glass, metal or other bulky containers can be avoided, the necessity of bottling, shipping and storing carbonated beverages consisting mostly of water is eliminated and portability is greatly enhanced. Furthermore, the problem of disposable and returnable cans and bottles would be alleviated.

U.S. Pat. No. 2,073,273 (Wetstein) discloses preparation of a carbonated beverage wherein water, sweetener and flavour are placed in a small pressure vessel and a metal cartridge containing carbon dioxide is inserted into the sealed vessel. Movement of the cartridge causes piercing thereof, thereby injecting carbon dioxide into the water to form the carbonated beverage. The carbon dioxide also pressurizes the vapor space above the liquid, thereby enabling the carbonated beverage to egress the vessel through a serving nozzle when an external valve is opened. This device met with some measure of success in preparing unflavoured and unsweetened carbonated water for home use but the carbonation was not equivalent to that of bottled club soda, nor was there any financial advantage since the cartridges were costly.

The prior art includes a significant number of dry compositions for use in preparing carbonated beverages at home. In most cases, a source of carbonate and acid is combined with sweeteners and a source of flavour so that upon addition of the composition to a glass of water, the carbonate and acid react to yield carbon dioxide and at least some measure of carbonation to the beverage. Among the prior patents describing this and similar techniques, are U.S. Pat. No. 2,603,569 (Alther) which discloses the carbonation of a citric acid-sucrose complex with a sodium bicarbonate-sucrose complex; U.S. Pat. No. 2,742,363 (Hughes) which claims a combination of an alkali metal bicarbonate and sulfonic acid ion exchange resin in its hydrogen form, U.S. Pat. Nos. 2,851,359 and 2,953,459 (Diller) in which a highly soluble phosphate and slowly soluble phosphate are combined with an alkali metal or ammonium carbonate or bicarbonate to prolong ebullition of the beverage. U.S. Pat. No. 3,241,977 (Mitchell et al) which discloses chemical carbonation with citric, adipic or tartaric acid in finely divided form and which is said to approximate the carbonation sensation of cola-type beverages, U.S. Pat. No. 3,441,417 (Feldman et al) which discloses a dry beverage composition adapted to be reconstituted with water to form an effervescent beverage and which includes as an essential carbonating ingredient an organic compound having a carbonic acid anhydride group capable of controlled hydrolysis in water to release carbon dioxide at a substantially uniform rate, and U.S. Pat. No. 3,667,962 (Fritzberg et al) which describes a carbonation composition utilizing two distinct bodies formed from an aqueous solution of a saccharide, one containing an edible food acid and the other an edible bicarbonate. Upon addition to water, the two tablets dissolve quickly and react to evolve carbon dioxide. This system has not been perfected nor approved by the F.D.A.

Many of the dry powder chemical systems have a common and acknowledged defect, namely an unpleasant taste in the beverage directly resulting from the components of the powder. Various techniques have been disclosed in the above-mentioned patents to attempt to mitigate this disadvantage, but such techniques are either complicated or expensive or not entirely successful.

Attention is also directed to U.S. Pat. Nos. 2,631,521 (Atkins, Jr.), 2,694,641 (Atwood, et al), 2,712,998 (Vosseler), 3,112,201 (Saez), 4,009,285 (Spooner) and 4,423,670 (Tenison).

In summary, none of the above-discussed prior proposals produces adequate and controlled carbon dioxide production under pressure, nor have they met with F.D.A. approval due to their instability.

SUMMARY OF THE INVENTION

Accordingly, it is an object of the present invention to provide a method and package for producing carbonated beverages in the home which avoids or mitigates most of the above-discussed problems and disadvantages.

To this end, one aspect of the present invention provides a method of producing a carbonated beverage which comprises, dispensing into a sealable receptacle a predetermined amount of a liquid flavour extract, adding to the receptacle a predetermined amount of sugar and adding an amount of water to provide suitable dilution of the flavour extract and an acidulant and a buffer to adjust the pH level to 3.5 or lower, thereafter adding to the receptacle an appropriate portion of yeast, and agitating the contents to achieve mixing and permitting the receptacle to stand for sufficient time to effect fermentation by the yeast and continuing fermentation until the pH level drops to 3.0 or lower, whereby to produce a carbonated beverage.

A further aspect of the invention provides a unitary carbonated beverage package comprising a liquid flavour extract having admixed therewith an acidulant and a buffer, a predetermined measured portion of yeast, dispensing means for releasing a predetermined amount of extract into a sealable receptacle, whereby to produce in the receptacle after the addition of sugar and water a solution having a pH of 3.5 or lower and capable of undergoing fermentation by the yeast until the pH level decreases to 3.0 or lower, so as to produce a carbonated soft drink product.

DETAILED DESCRIPTION OF THE INVENTION

In order to achieve satisfactory quality of the product, the flavour extract normally contains suitable amounts of acidulant, buffer, nutrient and/or other special effect additives. An approved colouring substance can, of course, also be included.

The yeast can conveniently be employed in encapsulated form of size such that one capsule of yeast (and packing such as icing sugar) is required for each one liter bottle of beverage to be produced. A suitable dehydrated yeast strain possesses the following desirable properties for use in the beverage kit:

(1) the yeast must have good settling out properties and should not be too easily disturbed once it has settled out of the beverage.

(2) the yeast must have the ability to multiply and produce carbon dioxide under a pressure of approximately 60 psi.

(3) the yeast must have a consistent pH operating range of 2.5 to 4.0 or slightly higher, e.g. 2.9 to 3.5 or 4.0.

(4) the fermentation speed should also be favourable at room temperature.

(5) the yeast should have a shelf life of at least one year without refrigeration.

Examples of suitable yeasts include *Saccharomyces cerevisiae* and *Schizosaccharomyces pombe*. Other yeasts of these genera can also be employed.

Generally speaking, the quantity of yeast required for each capsule for use with respect to producing one liter of soft drink beverage will be 0.05 to 0.20 gram.

The flavour extract can be any of the regularly available flavours such as cola, ginger ale, cream soda, grape, black cherry, lemon or orange. Such concentrated flavour extracts are commercially widely available. Generally speaking, the concentration of the flavour will be such that from 5 to 20 ml and usually about 10 ml thereof will be required for producing one liter of beverage. The flavour base is supplemented with appropriate amounts of acidulants, such as citric and phosphoric acid, so as to give the flavour structure of the finished beverage the necessary desirable "bite" effect. The amount of acidulant is generally in the range of 30 to 60 percent by volume, based on the base flavour extract.

It is also necessary to add to the base flavour a yeast nutrient, such as dibasic ammonium phosphate, which is essential for attaining satisfactory fermentation. In general, such a yeast nutrient will be present in the flavour base in an amount of from 10 to 40 percent by weight based on the flavour base.

Most commercial soft drink beverages have a pH value of about 2.4 to 2.8, which is produced by the various acids present which provide the "bite" effect in the flavour structure. This bite effect is largely a result of disassociated hydrogen ions and to a much lesser degree the presence of associated hydrogen ions. By using dibasic ammonium phosphate as both a buffer and a yeast nutrient, some unique controls can be developed. After determining the level of bite required in the finished beverage, the buffer and acids can then be added to the flavour extract until the correct bite level is achieved at a pH of approximately 2.8, which is the point where fermentation will be retarded or eliminated. The level of carbonation can also be controlled by this system. The amount of carbon dioxide production is related to the amount of nutrient available, the time available to ferment and the pH value. By further addition of the nutrient/buffer, the potential amount of carbon dioxide production is increased thereby providing for specific volumes of carbon dioxide for the finished beverage. Most flavours will require buffering to a pH of 3.5 to 4.0 to enable them to acquire the normal volumes of gas, bearing in mind that each beverage has a different requirement. As the yeast consumes the dibasic ammonium phosphate nutrient/buffer, the pH starts to drop and when it reaches the 2.8 to 2.9 level, fermentation will retard or terminate. Thus, the pH changes as carbonation proceeds. The bite will reappear at approximately the anticipated level and the volume of carbon dioxide produced will be approximately as desired.

Currently available consumer beverage products suffer from several shortcomings. For example, a large vessel is usually employed to mix sugar, water and a bottle of flavour extract and many consumers do not have such a utensil available to them in the correct size. Bakers yeast is mixed in, normally in an amount of half teaspoon or an amount that can easily be measured by the user. However, this method is open to inaccuracy giving rise to an unsatisfactory product. This conventional batch-type process requires many bottles, thus tempting the consumer to utilize unsafe bottles of the type that will not withstand pressure. The beverage is left to ferment for a period of time, after which excessive pressure builds up and increased amounts of alcohol are produced with concomitant decrease in the sweetness of the product. Only cold storage or excessive pressure can terminate fermentation before the sugar is totally consumed. The conventional process is incapable of producing beverages that employ acidulants for the bite effect required for most commercial beverages. Only bland, flat flavours having a pH of 4.0 or above can be produced. Production of a single bottle of soft drink beverage would be quite impractical as the ingredients would be too difficult to measure.

In contrast, with the method and package of the invention, a large vessel is unnecessary and the consumer simply adds sugar, water and the prescribed amount of flavour extract into the bottle using a liquid dispensing cap. To avoid errors in the amount of yeast required, the yeast and a packing material are encapsulated into standard size capsules with one capsule being required for each one liter bottle. Thus measuring of the yeast is avoided. The consumer can readily and quickly produce one bottle at a time or multiples thereof with the same or different flavours and the temptation to use unsafe bottles is accordingly reduced. The beverage is simply left to ferment for a suitable amount of time during which the chemical change taking place namely consumption of a small amount of sugar and the joint nutrient/buffer, eventually brings fermentation to a halt automatically without cooling or refrigeration. The method of the invention will produce naturally carbonated beverages including acidulants as part of the flavour structure, while the carbon dioxide level is pre-controlled by the formulation employed, so that over-carbonation is unlikely.

In another embodiment of the invention, the liquid flavour extract is packaged into individual envelopes, in amounts such that a single envelope provides sufficient extract for producing one liter of beverage. This obviates the need for a dispensing cap or other dispensing means. The envelope is simply added to the sealable receptacle and the sugar and yeast capsule added as before, followed by agitation and fermentation.

Thus, a further aspect of the invention provides a beverage package for use in producing a carbonated beverage, which package includes, a plurality of individual packaged portions of liquid flavour extract, and a plurality of predetermined portions of yeast, the arrangement being such that a packaged portion of liquid flavour extract can be released into a sealable receptacle, together with a portion of yeast and a sufficient amount of sugar as well as water to substantially fill the receptacle, whereby to permit in the receptacle the fermentation by the yeast and concomitant generation of carbon dioxide in a pressure controlled manner so as to produce a carbonated beverage.

DESCRIPTION OF THE PREFERRED EMBODIMENTS

The following non-limitative examples illustrate the invention.

EXAMPLE 1

A carbonated ginger ale beverage was produced in individual quantities of one liter. As a first step, 119 gram portions of white sugar (sucrose) were measured into clean one liter pvc bottles built to withstand carbon dioxide pressure. The ginger ale essence was contained in a bottle with volumetric graduations marked on the exterior thereof. Using a separately provided dispensing cap, which screws onto the bottle mouth, 10 ml portions of formulation were released into the bottles, which were then filled with warm water to within about 1 cm of the top. Each 10 ml portion of ginger ale essence contains approximately 3.1 ml ginger ale extract, 1.2 ml citric acid (anhydrous), 0.065 ml caramel color (acid proof) and 0.8 to 1.0 ml of dibasic ammonium phosphate, with the balance essentially water. The bottles were capped and the contents shaken until dissolved.

Thereafter, the caps were removed and the contents of one capsule of the activated yeast, *Saccharomyces cerevisiae,* was dropped into each bottle, which was then tightly recapped. The bottles and contents were stood for 15 minutes and then shaken until mixed. The pH value at this point prior to fermentation was 3.2 to 3.3. Thereafter, the bottles were allowed to stand in a warm area at 21° to 23° C. away from direct sunlight for approximately 7 to 8 days. At this stage the pH value had decreased to 2.90±0.05 and the internal pressure was 55-60 psi. Thereafter, the bottles were refrigerated in preparation for consumption.

EXAMPLES 2 to 5

A variety of carbonated beverages were produced (in a similar manner to that described in Example 1) in individual quantities of one liter. As a first step, white sugar (sucrose) was measured into clean one liter pvc bottles built to withstand carbon dioxide pressure. The amount of sugar required depends on the flavour selection and was as set out in Table 1 below. The flavour essences were each contained in a bottle with volumetric graduations marked on the exterior thereof. Using a separately provided dispensing cap, which screws onto the bottle mouth, 10 ml of the appropriate formulation was released into each bottle, which was then filled with warm water to within about 1 cm of the top. The bottle was capped and the contents shaken until dissolved.

Thereafter, the caps were removed and the contents of one capsule of the same activated yeast as employed in Example 1 was dropped into each bottle, which was then tightly recapped. The bottles and contents were stood for 15 minutes and then shaken until mixed. Thereafter, the bottles were allowed to stand in a warm area at room temperature away from direct sunlight for the prescribed time as set out in Table 1, at which point the pH value decreased to about 2.8 to 2.95 and the internal bottle pressure was about 55 to 60 psi. Thereafter, the bottles were refrigerated in preparation for consumption.

Each flavour essence contained the stated natural and/or artificial flavour as listed in Table 1, citric acid, dibasic ammonium phosphate, artificial color, saponine, gum arabic and sodium benzoate.

The following Table 1 lists the sugar requirement and the fermentation requirement.

TABLE 1

| Flavour Selection | SUGAR PER LITER | | | | days req'd. |
|---|---|---|---|---|---|
| | weight | | volume | | |
| | g | oz | ml | fl oz | |
| Cola | 126.8 | 4.5 | 150 | 5.3 | 6-7 |
| Cream Soda | 141.7 | 5.0 | 168 | 5.9 | 8-9 |
| Lemon Tingle | 116.2 | 4.1 | 137 | 4.8 | 7-8 |
| Black Cherry | 124.7 | 4.4 | 147 | 5.2 | 8-9 |

Other flavours such as cherry-cola, root beer, orange, sarsparilla and blueberry can be similarly used.

The acidity in the formulation may be changed so as to modify the degree of "bite" and certain yeast strains can be employed that operate at a pH that is even lower than 2.8.

What is claimed is:

1. A method of producing a carbonated beverage which comprises:
   (a) dispensing into a sealable receptacle predetermined amounts of a liquid flavour extract and sugar, an amount of water to provide suitable dilution of said flavour extract, and predetermined amounts of an acidulant and a yeast nutrient buffer to adjust the initial pH level of said diluted flavour extract within said receptacle to less than about 4.0;
   (b) thereafter adding to said receptacle an amount of a yeast sufficient to produce said carbonated beverage, said yeast being operational in a pH range falling within an overall range of about 2.5 to about 4 and being operational at and below said initial pH level; and
   (c) then mixing the contents of the receptacle and permitting the receptacle to stand to effect fermentation by said yeast with concomitant generation of carbon dioxide, and continuing fermentation with progressive consumption of sugar and nutrient buffer and decrease in pH level until the pH level drops to a value which is not more than about 3.0, and which is below the operational pH range of said yeast, thereby automatically terminating the fermentation process without cooling or heating and resulting in the production of a carbonated beverage in said receptacle.

2. A method according to claim 1, wherein the liquid flavour extract also contains one or more nutrients and coloring agents.

3. A method according to claim 2, wherein the liquid flavour extract contains said nutrient buffer.

4. A method according to claim 3, wherein the nutrient buffer is dibasic ammonium phosphate.

5. A method according to claim 4, wherein the nutrient buffer is employed in an amount of 10 to 40 percent by weight based on the flavour extract.

6. A method according to claim 2, wherein the liquid flavour extract includes a citric acid, phosphoric acid or both thereof as acidulant.

7. A method according to claim 6, wherein the quantity of acidulant is from 30 to 60 percent by volume, based on the flavour extract.

8. A method according to claim 1 or 2, wherein the flavour of the liquid extract is selected from cola, ginger ale, cream soda, grape, cherry, lemon, orange, root beer, blueberry and sarsparilla.

9. A method according to claim 1, wherein the yeast is *Saccharomyces ceravisiae* or *Schizosaccharomyces pomba*.

10. A method according to claim 1, wherein at termination of the fermentation process, the carbon dioxide pressure in said receptacle is 55 to 60 p.s.i.

11. A method according to claim 1, wherein fermentation is continued until the pH value of the mixture decreases and is reduced to about 2.8 to 3.0.

12. A method of producing a pressure controlled carbonated beverage, which comprises:
   (a) dispensing into a sealable receptacle from 5 to 20 ml per liter of receptacle capacity of concentrated liquid flavour extract, which extract contains appropriate amounts of acidulant and yeast nutrient buffer;
   (b) then adding to said receptacle an appropriate amount of sugar, and filling the receptacle with water to provide suitable dilution of said flavour extract, said amounts of acidulant and nutrient buffer being sufficient to effect an adjustment of the initial pH level of said diluted flavour extract within the receptacle to about 3.5;
   (c) thereafter adding to said receptacle from 0.05 to 0.2 gram per liter of overall liquid of an active yeast operational over the pH range of about 2.9 to about 3.5;
   (d) agitating the contents of the receptacle to achieve mixing and permitting the receptacle to stand at ambient temperature to allow adequate fermentation by said yeast with concomitant generation of carbon dioxide; and
   (e) continuing fermentation with progressive consumption of sugar and yeast nutrient buffer and decrease in pH level until the pH level is reduced to below about 2.9, thereby effectively terminating operation of said yeast and the fermentation process automatically without cooling or heating, and resulting in production of a carbonated beverage in said receptacle.

13. A method according to claim 12, wherein the nutrient buffer is dibasic ammonium phosphate and the acidulant is citric and/or phosphoric acid.

* * * * *